United States Patent
Seiler

(10) Patent No.: US 8,046,499 B2
(45) Date of Patent: Oct. 25, 2011

(54) METHOD FOR TRANSFERRING DATA VIA A FIELDBUS OF THE PROCESS AUTOMATION TECHNOLOGY

(75) Inventor: Christian Seiler, Auggen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 697 days.

(21) Appl. No.: 10/545,965

(22) PCT Filed: Feb. 18, 2004

(86) PCT No.: PCT/EP2004/001534
§ 371 (c)(1),
(2), (4) Date: Jul. 28, 2006

(87) PCT Pub. No.: WO2004/075069
PCT Pub. Date: Sep. 2, 2004

(65) Prior Publication Data
US 2007/0043877 A1    Feb. 22, 2007

(30) Foreign Application Priority Data
Feb. 21, 2003 (DE) .................... 103 07 650

(51) Int. Cl.
*G06F 15/16* (2006.01)
(52) U.S. Cl. ........................ 709/253; 709/246
(58) Field of Classification Search .................. 709/250, 709/253, 246
See application file for complete search history.

(56) References Cited

U.S. PATENT DOCUMENTS

| | | | |
|---|---|---|---|
| 6,192,281 B1* | 2/2001 | Brown et al. | 700/2 |
| 6,522,664 B1* | 2/2003 | Kawahara | 370/466 |
| 6,701,377 B2* | 3/2004 | Burmann et al. | 709/249 |
| 6,826,590 B1* | 11/2004 | Glanzer et al. | 709/200 |
| 6,944,555 B2* | 9/2005 | Blackett et al. | 702/62 |
| 7,058,712 B1* | 6/2006 | Vasko et al. | 709/224 |
| 2002/0042845 A1 | 4/2002 | Burmann | |
| 2002/0120671 A1 | 8/2002 | Daffner | |
| 2002/0141418 A1* | 10/2002 | Ben-Dor et al. | 370/398 |
| 2003/0023723 A1* | 1/2003 | Griech | 709/224 |
| 2003/0041135 A1* | 2/2003 | Keyes et al. | 709/223 |
| 2003/0172143 A1* | 9/2003 | Wakayama | 709/223 |
| 2005/0066104 A1* | 3/2005 | Train et al. | 710/305 |
| 2007/0112976 A1* | 5/2007 | Anders et al. | 709/246 |
| 2008/0052386 A1* | 2/2008 | Johnson et al. | 709/223 |
| 2009/0062931 A1* | 3/2009 | Keyes et al. | 700/7 |

FOREIGN PATENT DOCUMENTS

DE   197 39 297 A1   3/1999

(Continued)

OTHER PUBLICATIONS

Fieldbus Foundation Technical Overview, FD-043, Revision 2.0, Aug. 1998.

(Continued)

*Primary Examiner* — Kevin Bates
*Assistant Examiner* — Oleg Survilo
(74) *Attorney, Agent, or Firm* — Bacon & Thomas, PLLC

(57) ABSTRACT

In a method for transmitting data over a fieldbus of process automation technology with a field device in which a first application program for a first fieldbus protocol runs, the data of a second application program for a second transmission protocol are mapped onto the first fieldbus protocol and transmitted as fieldbus telegrams.

7 Claims, 2 Drawing Sheets

FOREIGN PATENT DOCUMENTS

DE 101 09 196 A1 9/2002
EP 1 312 992 B1 5/2003

OTHER PUBLICATIONS

Auszug aus Foundation Fieldbus Dokument T1 38K02A01-001E, May 1, 2001.

Profibus Profile Hart, Version 1, Jul. 2001, Order No. 3.102.

Dr. Gunther Strohrmann, Automatisierungs-technik, Band I:Grundlagen, analoge und digitale Prozeβleitsysteme, 3, Germany 1992.

Technical Report IEC TR 61158-1, 2003.

International Standard CEI/IEC 1158-2, First Edition, 1993-12.

* cited by examiner

METHOD FOR TRANSFERRING DATA VIA A FIELDBUS OF THE PROCESS AUTOMATION TECHNOLOGY

FIELD OF THE INVENTION

The invention relates to a method for transferring data via a fieldbus of process automation technology.

BACKGROUND OF THE INVENTION

The invention relates to a method for transferring data via a fieldbus of process automation technology, as such method is defined in the preamble of claim 1.

In process automation technology, field devices are frequently used, in order to control the flow of an industrial process.

To this end, process variables are registered with the help of sensors, and controlled variables are controlled with the help of actuators.

Field devices for determining flow rate, fill level, pressure difference, temperature, etc. are generally known. They serve for registering the corresponding process variables flow rate, fill level, pressure, temperature, etc., and are most often arranged in the immediate vicinity of the process components of concern.

Examples of actuators are controllable valves, which control the flow rate of a liquid or gas in a section of pipeline.

The field devices are frequently connected via a fieldbus with a control unit, which controls the total process flow. In the control units, the measured values of the individual sensors are evaluated and the appropriate actuators are actuated.

Often, fieldbusses are also connected with superordinated communication networks, which serve for data communication with control systems and with company and/or office equipment. In this way, an integrated communication is possible within a company, from the field level into the various company levels. Besides a bounded communication in the local networks LAN, with appropriate connection, also a worldwide communication via the Internet WAN is possible.

In the control systems, process flow is monitored and visualized. Error reports are recorded there. From the control system, direct access to the individual field devices is also possible. This enables querying and modification of parameter values and configuration data. Additionally, diagnosis functions can also be called-up from the control system.

Recently, in process automation technology, systems have also become know, in the case of which the fieldbus is dispensed with, and the field devices are connected directly with a superordinated communication network. The most wide spread network is Ethernet with TCP/IP. Via this, a compatibility within various company levels and, beyond this, also outside of the company, is possible with the Internet.

Via the company network, emails and process data can, in this way, be transmitted simultaneously.

The superordinated company networks based on Ethernet work according to the client/server principle. Fieldbusses, in contrast, work according to the publisher/subscriber principle. The protocols are correspondingly designed.

The strengths of Ethernet with TCP/IP lie in the monitoring/parametering of plants, or plant parts, as the case may be. For control with distributed intelligence, fieldbusses are, in contrast, better suited.

At present, in the case of fieldbusses, no method for data transmission is known, which is capable of meeting both requirements.

SUMMARY OF THE INVENTION

An object of the invention is, therefore, to provide a method for data transmission via a fieldbus of process automation technology, which is suited both for control tasks and also for monitoring tasks.

This object is achieved by a method which comprises the steps of:

a method for transmitting data via a fieldbus of process automation technology, comprising the steps of:

providing a field device in which a first application program runs for a first fieldbus protocol, which exchanges data with the fieldbus according to the first fieldbus protocol in fieldbus telegrams via a fieldbus interface of the field device; and providing a second application program in the field device for a second transmission protocol, protocol data of which are mapped onto the first fieldbus protocol and transmitted as fieldbus telegrams.

An essential idea of the invention is to map the protocol data of a second transmission protocol onto the fieldbus protocol, so that such can then be transmitted via the fieldbus.

In a simple manner of putting the invention into practice, the data field in the frame of the fieldbus telegram contains a frame of a second transmission protocol.

In order to be able to distribute the data in the field device application-specifically, there is provided in the field device a distributor module, which analyzes the incoming fieldbus telegrams and forwards them, depending on their content, to the appropriate application or applications.

In the case of the fieldbus system, such is, for example, a Profibus®, or a Foundation Fieldbus®, system.

Advantageously, the second transmission protocol corresponds to the wide spread TCP/IP-standard.

In a simple manner, a Web-server can, in this way, be implemented in the field device.

In order to enable communication with the telecommunication networks present worldwide, a packaging gateway is provided, which maps the protocol data of the second transmission protocol into the fieldbus protocol, or, as the case may be, unpacks such in the opposite direction.

An essential advantage of the invention resides in the fact that, for the querying and configuring of field devices, special tools are no longer necessary. Access is possible by means of standard browsers (Netscape Navigator®, Internet Explorer®). At the same time, the advantages of conventional fieldbusses can continue to be used in the method of the invention.

For the parametering and configuring of field devices, various tools are available. A suitable tool is e.g. the configuring and parametering program CommunWin 2 of the firm Endress+Hauser. The functionality of the field devices to be operated is made known in these operating tools with the help of so-called device descriptions.

BRIEF DESCRIPTION OF THE DRAWINGS

The invention will now be explained in greater detail on the basis of an example of an embodiment illustrated in the drawing, the figures of which show as follows.

DESCRIPTION OF THE PREFERRED EMBODIMENTS

Figure 2:
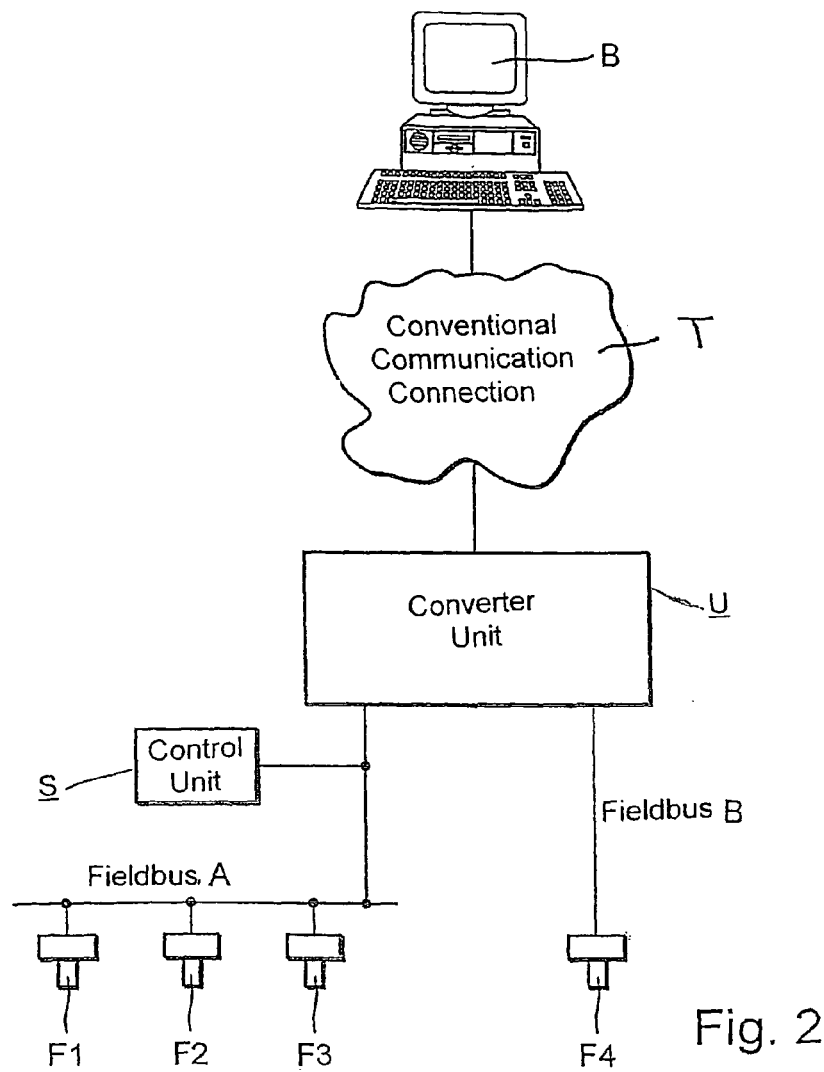
FIG. 2 network with operating device and a plurality of field devices in schematic presentation.

FIG. 2 shows an operating device B connected via a plurality of networks with various field devices F1, F2, F3 and F4. Serving as a first network connection between the operating device B and a converter unit U is a conventional communication connection T. This communication connection T can be a WAN Wide-Area-Network (Internet), LAN Local-Area-Network (intranet), or a direct Internet protocol connection. This connection is provided via the known services GSM, UMTS, PSTN, ISDN, Ethernet, etc.

Emanating from the converter unit U are two fieldbusses A and B leading to the field level, with three field devices F1, F2, F3 in the one case and a field device F4 in the other. Additionally connected to fieldbus A is a control unit S (e.g. a programmable logic controller PLC). The field devices F1, F2, F3 communicate via fieldbus A with the control unit S, which evaluates the measured values of the individual field devices and appropriately actuates actuators (not shown).

Figure 1:
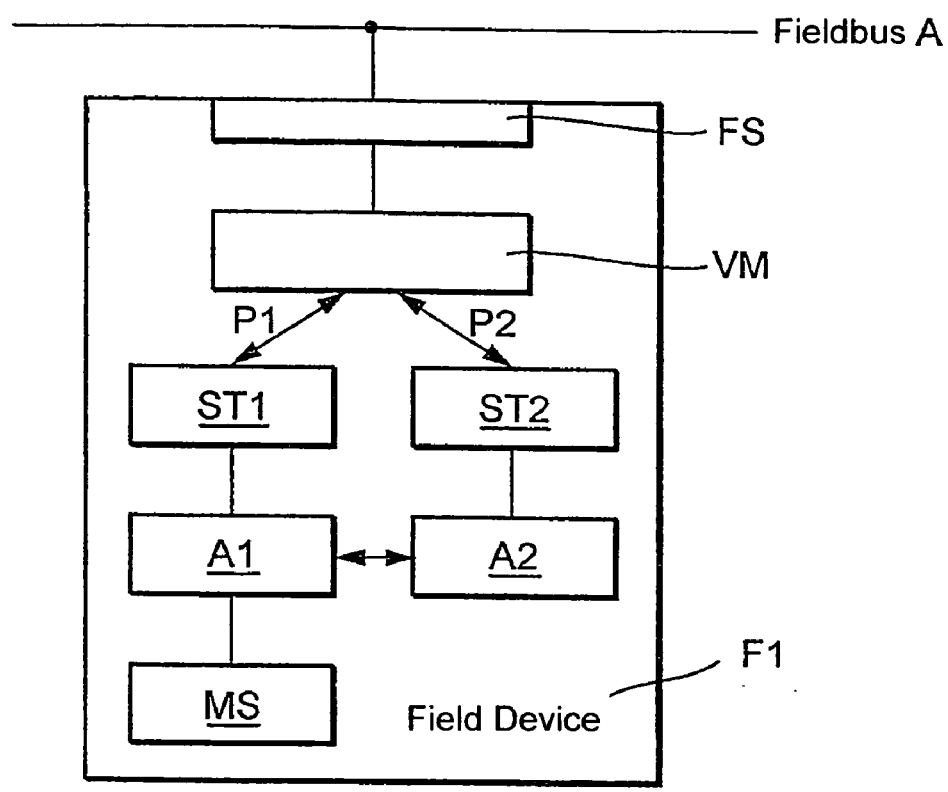
FIG. 1 hardware-software-structure of a field device of the invention.

FIG. 1 shows the hardware-software-structure of a field device (F1, F2, F4) of the invention on the basis of the field device F1 selected by way of example. (Field device F3 is a conventional field device.) Field device F1 is connected with fieldbus A via a fieldbus interface FS. A distributor module VM, which is connected after the fieldbus interface FS, distributes protocol data P1 and P2 either to the communication stack ST1 or ST2, as the case may be. Connected after the two stacks ST1 and ST2 are the respective applications A1 and A2. Application A1 is connected to a measurement pickup interface MS. Between the applications A1 and A2, a data exchange is possible. Conventional field devices, such as the field device F3, have only the fieldbus interface FS, the communication stack ST1 and the fieldbus application A1, as well as the measurement pickup MS.

Figure 3:
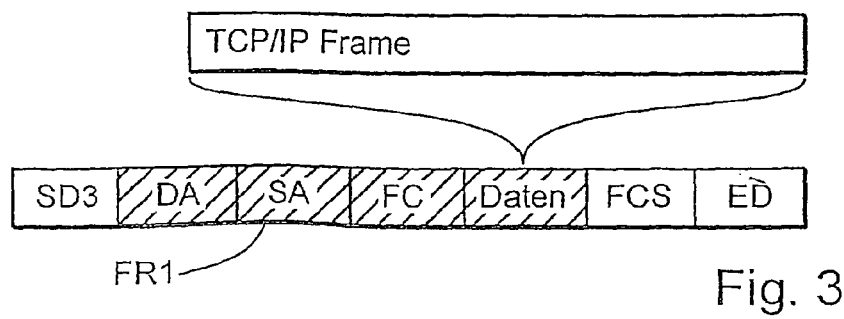
FIG. 3 structure of a fieldbus frame.

FIG. 3 shows a fieldbus frame FR1 with a normal data field, or with a frame of another transmission protocol. By way of example, a Profibus frame is shown, which contains a TCP/IP frame. The Profibus frame FR1 is composed of a plurality of data fields: SD3 Start Delimiter; DA Destination Address; SA Source Address; FC Function Code; Data; FCS Frame Check-Sum; and the End Delimiter ED. The data field Data can contain e.g. normal measured values, or also a TCP/IP frame with the corresponding data.

The functioning of the invention will now be explained in further detail.

The fieldbus application A1 can communicate in the usual way with the control unit S via the fieldbus A. The data provided from the fieldbus application A1 are packaged with the help of the fieldbus stack ST1 and issued onto the fieldbus A via the distributor module VM and the fieldbus interface FS. The distributor module VM forwards the fieldbus frame FR1, which contains normal fieldbus data, to the fieldbus interface FS without change. Incoming telegrams are analyzed in the distributor module as to whether fieldbus data P1 or protocol data P2 of another, second transmission protocol are contained in the data field. In the one case, the protocol data are forwarded to the fieldbus stack ST1, in the other case to the communication stack ST2. The data then go either to the fieldbus application A1 or to the application A2. The application A2 can include e.g. a Web-server, or an OPC-server. Of course, field devices can exchange data corresponding to the first or second protocol. Thus, corresponding applications in the respective field devices can communicate very easily with one another.

The functioning of the converter unit U will now be described in greater detail. The converter unit U, which serves as a packaging gateway, packages the TCP/IP protocol data into the fieldbus protocol and forwards such to the appropriate fieldbus A or B, as the case may be. Correspondingly, fieldbus telegrams from the fieldbus are unpacked and forwarded as TCP/IP telegrams to the corresponding communication connection T. The converter unit U can be connected with one or more fieldbusses, which work, especially, also on the basis of different protocols. Equally, one or more different networks working on the basis of the second transmission protocol can be connected to the converter unit U.

With the operating device B, therefore, a simple access to the desired field devices is possible. Via a Web-browser, the field devices F1, F2 or F4, as the case may be, can be configured and parametered from the operating device B. A significant advantage of the invention is that the operating device B can directly access HTML-pages stored in the field devices F1, F2 or F4, as the case may be. The operating device B requires no special device description of the field device which is to be operated.

With the help of the present invention, it is possible to install TCP/IP applications in field devices, without having to make changes in the existing fieldbus. Field devices without TCP/IP applications and field devices with TCP/IP applications work independently of one another. A significant advantage of the invention is that TCP/IP applications can communicate over a two-wire connection with a widely removed operating device. Such field devices can also be used simply in explosion-endangered areas (EX-areas).

The converter unit can also serve as firewall and provide various services for the field devices F1, F2, F4 on the basis of the second transmission protocol.

Additionally, the converter unit can also serve as router between the various connected networks.

The invention claimed is:

1. A method for transmitting data between a service tool and at least one field device comprising a sensor or an actuator via at least a fieldbus of process automation technology and an Internet databus, data on the fieldbus is transferred via a fieldbus protocol of the fieldbus and wherein data on the Internet databus are transferred via an Internet protocol, the method comprising the steps of:

running a first application program in the at least one field device, the first application program operating in conjunction with the fieldbus protocol;

exchanging data by the first application program in fieldbus telegrams via a fieldbus interface of the at least one field device according to the fieldbus protocol;

running a second application program in the at least one field device, the second application program operating in conjunction with the Internet protocol, wherein the second application program maps the data of the Internet protocol onto the fieldbus protocol and transmits the data in the fieldbus telegrams via the fieldbus interface; and running a distributor module in the at least one field device that analyzes incoming fieldbus telegrams and forwards the incoming fieldbus telegrams to either the first or the second application program, depending on the content of the incoming fieldbus telegrams.

2. The method as claimed in claim 1, wherein:

the mapping of the protocol data of the Internet protocol onto the fieldbus protocol occurs such that a frame of the Internet protocol is contained in the data field of a fieldbus frame of the fieldbus telegram.

3. The method as claimed in claim 1, wherein:
the fieldbus protocol corresponds to the Profibus-standard or the Foundation Fieldbus (FF)-standard.

4. The method as claimed in claim 1, wherein:
the Internet protocol corresponds to the Internet Protocol (IP)-standard.

5. The method as claimed in claim 4, wherein:
the IP-standard comprises Transmission Control Protocol (TCP).

6. The method as claimed in claim 1, wherein:
the second application program comprises a Web-server application.

7. The method as claimed in claim 1, wherein:
two or more field devices exchange data with one another via the fieldbus, and the first and the second application programs within the field device communicate with one another via local data exchange.

* * * * *